May 15, 1934.  E. M. TUCKER  1,958,871
WATERPROOF MEMBRANE
Filed Sept. 9, 1931
Fig.1
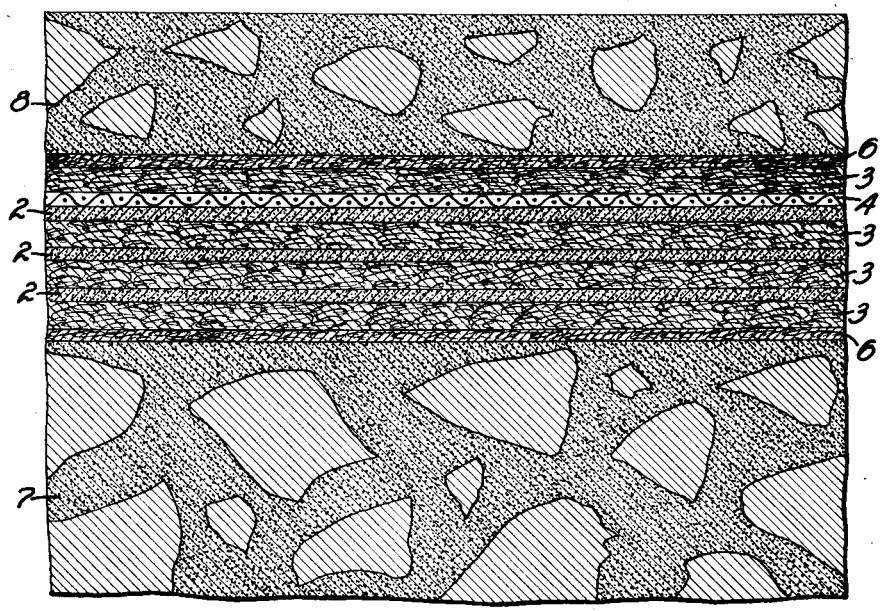
Fig.2
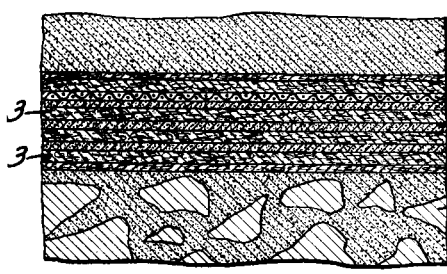
Fig.3
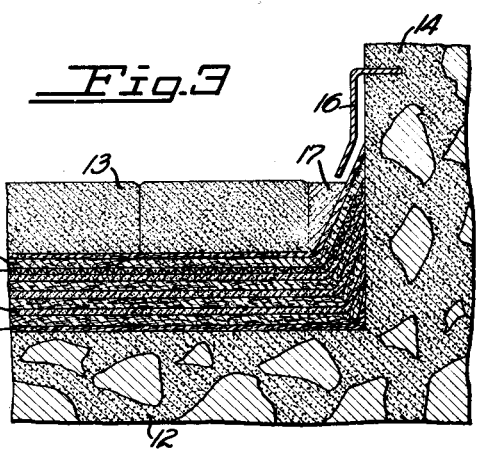
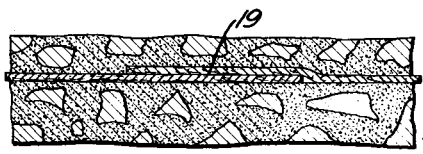
Fig.4
INVENTOR.
EDGAR M. TUCKER
BY Charles S. Evans
HIS ATTORNEY Patented May 15, 1934

1,958,871

UNITED STATES PATENT OFFICE 1,958,871

WATERPROOF MEMBRANE

Edgar M. Tucker, South Pasadena, Calif., assignor to The Paraffine Companies, Inc., San Francisco, Calif., a corporation of Delaware Application September 9, 1931, Serial No. 561,863

14 Claims. (Cl. 72—127)

My invention relates to membranes, and particularly to waterproofing membranes for use in building construction.

One object of my invention is to provide a waterproof membrane for use in concrete and masonry building construction which is non-cohesive with respect to contiguous surfaces.

Another object is to provide an improved waterproof membrane which is free-floating relative to contiguous bodies and which is unimpaired by rupture or stress in such contiguous bodies.

A further object is to provide an improved waterproof membrane of infrangible character, and which is highly resistant to injury by cutting or puncturing.

A further object is to provide an improved waterproof membrane which tends to self-healing with respect to minor cracks or injury.

Another object is to provide an improved membrane which may be fabricated economically at a factory or at the point of installation, and which may be readily adapted to satisfy the requirements of various installations.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a fragmentary sectional view on an exaggerated scale of a concrete floor construction having the waterproof membrane of my invention in place.

Figure 2 is a fragmentary sectional view on an exaggerated scale showing the membrane of my invention applied between a concrete slab and an earth fill.

Figure 3 is a fragmentary sectional view on an exaggerated scale showing the membrane of my invention installed beneath a tile surfacing.

Figure 4 is a fragmentary sectional view on an exaggerated scale showing the manner of laying a light type of membrane with overlapping joints.

In building construction of various types, it is frequently necessary or desirable to interpose a waterproof membrane between contiguous bodies to prevent the absorption or seepage of water therethrough. For example it is often desirable to provide a waterproof membrane between adjacent layers or slabs of concrete or masonry in floor, wall, or roof construction; between concrete or masonry and an earth fill; under concrete or tile topping; under concrete decks; over tunnels; under sidewalks over basements; over concrete bridges; and in numerous other instances.

Waterproof membranes such as heretofore used in building construction have been found to be defective in that they cohere with and become permanently bonded to the contiguous surfaces of adjacent bodies. As a result, cracks which may be caused in the contiguous bodies due to internal or external stresses of various kinds, usually continue into and through the membrane, and the waterproofing property of the membrane is thereby destroyed. Where a membrane is bonded on its opposite sides to contiguous bodies, the relative expansion and contraction of the bodies frequently cause the intervening membrane to be ruptured, and the membrane may be damaged to the point of inoperativeness by movement of either contiguous body relative to the other, such as may be caused by vibration or by a settling of the building construction. Moreover, membranes of the character heretofore used, have been relatively frangible, and are easily damaged by breaks or punctures occurring in the course of installation. A break or puncture even of a minor character destroys the waterproofing property of membranes such as heretofore known and used.

My present invention overcomes these objectionable defects of previous membranes in that it provides a membrane of practically infrangible nature which does not become permanently bonded to contiguous bodies but maintains a free-floating relation to such bodies.

In terms of broad inclusion the membrane of my invention comprises a composite body surfaced on opposite sides thereof with material which is non-cohesive with respect to contiguous bodies or materials applied next to the membrane so as to prevent a permanent bonding of the membrane with adjacent surfaces. The membrane body is formed of a plurality of alternating layers or sheets of permanently plastic material interposed between sheets of fibrous material impregnated with semi-solid preservative and waterproofing material. The composite body is preferably reinforced by a woven web, the whole being sufficiently yieldable to withstand all ordinary stresses to which it may be subjected, without impairing its waterproofing property.

More specifically, the membrane of my invention comprises a plurality of sheets or layers 2 of a permanently yieldable or plastic and waterproof material interposed between a plurality of fibrous sheets 3 which are saturated with a semi-solid waterproofing material and bonded together by the intervening layers 2.

The layers 2 are preferably formed of bituminous material. The residual asphalt obtained from the distillation of asphalt base petroleum by the steam running process is particularly useful for this purpose. Such asphalt has a softening point of 190° F., 100 grams, 5 seconds by the method of the American Society for Testing Materials, Standards of 1927. This material has the quality of remaining in a semi-solid or plastic state for an indefinite period of time and constitutes an effective waterproofing material. This material has the further advantages of low cost, chemical inertness, and high mechanical and adhesive strength.

However, other suitable material may be substituted for the bituminous product above described if desired. For example, a softer asphalt mixed with coal tar or coal tar pitch to produce approximately the same consistency as that above stated, or a heavy bodied drying oil such as linseed oil made somewhat tacky by the addition of rosin and reduced to a plastic condition by the addition of finely divided inert material such as metallic oxides or silicious substances may also be substituted. Other materials possessing the properties of permanent plasticity, waterproofing qualities, and adhesive strength may also be substituted.

The fibrous sheets 3 are preferably made of a material capable of withstanding a moderate amount of stretching without rupture. For this purpose I prefer to use a good quality of rag felt weighing approximately 75 pounds per 480 square feet.

The fibrous sheets 3 are saturated preferably with an asphalt having a softening point of approximately 115° F. according to the testing methods above mentioned. The sheets may also be coated with an asphalt having a higher melting point similar to the material used for the layers 2, if desired. The fibrous sheets 3 are bonded together by the intermediate layers 2, and the sheets 3 and layers 2 form in effect a reservoir from which the saturant may flow to seal any small cracks or punctures which may occur in the membrane.

Other saturants, such as coal tar pitch or heavy bodied oil may be substituted for the asphalt material which I prefer to use as a saturant for the sheets 3. Where alternative materials, such as above described, are substituted for the bituminous material preferred for the layers 2, a saturant of comparable nature should be selected for the sheets 3 to insure an effective bonding of the layers 2 and sheets 3.

Fibrous material of other specific nature may be substituted for the preferred material for use in preparing the sheets 3. For instance, felt material of greater or less weight may be substituted according to the conditions or requirements to be met. Likewise woven fabric may be substituted, where severe conditions require its use in place of one or more of the felt sheets 3.

In order to reinforce and strengthen the membrane, I prefer to include in its body structure a woven web 4. The web 4 is preferably formed from a good grade of burlap saturated with a semi-solid saturant similar to the bituminous or asphaltic material used in forming the layers 2. The web 4 is disposed between an intermediate layer 2 and sheet 3 and is effectually bonded to the adjacent layers 2 and sheets 3 by the plastic materials forming the layers 2 and with which the sheets 3 and web 4 are saturated. If desired a light metallic mesh or screen may be substituted for the burlap web. A tough woven cotton fabric or other strong reinforcing material also may be substituted, where required.

The membrane is faced upon its top and bottom surfaces with fibrous sheets 6 preferably formed from a kraft or similar paper having a comparatively dense smooth outer surface. The sheets 6 are strongly bonded to the body of the membrane by the saturant carried by the adjacent sheets 3, and present an exposed surface which is non-cohesive with respect to cement or other building materials contacting therewith. The sheets 6 may also be made of woven or felt material sized or coated on their outer surfaces with inert material such as powdered soap stone or other material adapted to produce the desired non-cohesive properties.

The membrane may be fabricated at a factory, or it may be fabricated at the point of installation, depending upon the conditions and the requirements to be met.

For comparatively light structural and water pressures such as obtain in a basement only four or five feet underground, the membrane may comprise only a single layer 2 of plastic material interposed between fibrous sheets 3 and faced upon their outer sides by the sheets 6. Such a membrane may be conveniently fabricated into an integral sheet at a factory and formed into rolls which may be conveniently shipped to the point of installation. Such sheets are preferably applied with overlapping joints such as indicated at 19 in Figure 4 of the drawing. The joints are cemented with hot asphalt or with a suitable cement such as may be obtained by dissolving asphalt in carbon disulphide or equal parts of gasoline and toluol.

Where the conditions are more severe, such as obtain in basements 20 to 60 feet underground, or for heavy localized pressures such as may obtain under tiles or bricks laid to carry traffic, as indicated in Figure 3 of the drawing, a multilayer membrane such as indicated in the drawing is preferable. Such membranes are of a thickness ranging from ¼ to ½ inch and hence are somewhat difficult to handle when fabricated at a factory. Under such conditions, it is often preferably to fabricate the membrane at the point of installation. This may be accomplished by applying successive sheets and layers directly at the point of installation, or the layers and sheets may be divided into groups comprising a layer 2 interposed between sheets 3 at the factory and subsequently united by an intermediate layer 2 applied at the point of installation as the groups are laid in place.

For example, each group may comprise two sheets 3 with an intermediate layer 2 which may be fabricated at a factory, a sheet 6 being applied to the outer surface of each group intended to occupy an outer position. At the point of installation, a layer 2 is applied between adjacent groups so that the several groups are united to form a composite body or membrane at the point of installation. In applying groups in this manner, the various groups may be overlapped or staggered so that the joints may be fully sealed. The layers 2 between groups may be applied as a mop coating of hot asphalt or bituminous material, and the joints between adjacent sheets or groups of sheets may be effectually sealed in this manner, or by the use of a suitable cement.

The membrane thus formed is water-tight and is capable of withstanding severe strain without rupturing when in service. When wet materials such as cement, plaster, stucco, or the like are applied against a sheet 6 of the membrane, the absorption of water by the sheet 6 causes the wet materials to adhere to the sheet, without forming a permanent cohesive bond therewith. As the materials become dry, the adhesive bond between the building material and the sheet is weakened. The sheet 6 however remains firmly bonded to the body of the membrane by virtue of the adhesive and cohesive strength of the saturant and plastic materials which bond the sheets 3 together. When subjected to stress, the relatively lighter bond between the sheet 6 and the building material is broken before damaging strain is imposed upon the membrane, and as a result, the membrane is released and becomes free-floating between bodies contiguous thereto.

In the drawing I have illustrated some of the many ways in which the membrane may be applied for construction purposes. Thus, the manner in which the membrane is applied between adjoining construction masses such as concrete slabs 7 and 8, or between a concrete or masonry slab 9 and a dirt fill or back 11 is illustrated in Figures 1 and 2 respectively. In Figure 3 I have illustrated the application of the membrane between a base 12 and a tile or brick flooring 13. In this figure I have illustrated an arrangement wherein the ends of the various sheets and layers of the membrane are bent up against a side wall 14 to form a waterproof flashing in conjunction with a drip apron 16 fixed in the wall. A course 17 of suitable plaster or waterproof material, such as asphalt, is interposed between the end tier of the flooring 13 and the bent up ends of the membrane to allow for expansion and contraction of the flooring.

The yieldable nature of the fibrous sheets 3 and of the web 4, combined with the permanent plastic nature of the layers 2 is practically proof against ruptures or cracking after the membrane has been installed in place. The plasticity of the layers 2 and of the saturant with which the sheets 3 and the web 4 are impregnated, tends toward rendering the membrane substantially self-healing with respect to minor punctures or cracks which may occur during installation or in service. My improved membrane therefore constitutes a permanently effective barrier to the absorption or seepage of moisture.

I claim:

1. A membrane for construction purposes comprising a sheet of waterproof material interposed between adjacent structural masses and having an external layer having a surface permanently non-cohesive to the adjoining construction mass and providing a plane of slippage between the sheet and the mass for permitting relative movement parallel to the plane of the sheet, the membrane providing a waterproof barrier between the masses.

2. A membrane for construction purposes comprising a sheet of waterproof material interposed between adjacent structural masses and having external layers on opposite sides thereof having surfaces permanently non-cohesive to contiguous surfaces of the adjoining construction masses and providing planes of slippage between the sheet and the masses for permitting relative movement parallel to the plane of the sheet, the membrane providing a waterproof barrier between the masses.

3. A membrane for construction purposes comprising a laminated sheet of waterproof material interposed between adjacent structural masses and having an external layer having a surface permanently non-cohesive to the adjoining construction mass and providing a plane of slippage between the sheet and the mass for permitting relative movement parallel to the plane of the sheet, the membrane providing a waterproof barrier between the masses.

4. A membrane for construction purposes comprising a sheet interposed between adjacent structural masses and formed of a plurality of alternate layers of fibrous material and waterproof plastic material, and external layers having surfaces permanently non-cohesive to the adjoining construction masses and providing planes for slippage for permitting relative movement of the masses parallel to the plane of the sheet, the membrane providing a waterproof barrier between the masses.

5. A membrane for construction purposes comprising a sheet adapted for laying between adjacent structural masses and formed of a plurality of alternate layers of fibrous material and waterproof plastic material, and external layers of paper adapted in use to provide surfaces permanently non-cohesive to the adjoining construction masses for permitting relative movement parallel to the plane of the sheet and providing a waterproof barrier between the masses.

6. A membrane for construction purposes comprising a sheet adapted for laying between adjacent structural masses and formed of a plurality of alternate layers of fibrous material saturated with waterproof material and waterproof plastic material, and external layers adapted in use to provide surfaces permanently non-cohesive to the adjoining construction masses for permitting relative movement parallel to the plane of the sheet and providing a waterproof barrier between the masses.

7. A membrane for construction purposes comprising a sheet adapted for laying between adjacent structural masses and formed of a plurality of layers of fibrous material saturated with bituminous material and intervening layers of plastic bituminous material, and surfacing sheets bonded to outer layers and adapted in use to provide external surfaces permanently non-cohesive to the adjoining construction masses for permitting relative movement parallel to the plane of the sheet and providing a waterproof barrier between the masses.

8. A membrane for construction purposes comprising a sheet of waterproof material adapted for laying between adjacent structural masses and having a woven web embedded in the body and an external layer adapted in use to provide a surface non-cohesive to the adjoining construction mass for permitting relative movement parallel to the plane of the sheet and providing a waterproof barrier between the masses.

9. A membrane for construction purposes comprising a sheet adapted for laying between adjacent structural masses and formed of a plurality of layers of fibrous material saturated with bituminous material and intervening layers of plastic bituminous material, a woven web embedded in the body, and surfacing sheets bonded to outer layers and adapted in use to provide external surfaces permanently non-cohesive to the adjoining construction masses for permitting relative movement parallel to the plane of the sheet and providing a waterproof barrier between the masses.

10. A membrane for construction purposes comprising a laminated sheet interposed between adjacent structural masses and fabricated from a plurality of alternate layers of plastic bituminous material and fibrous material saturated with bituminous material, and surfacing layers bonded to the body to render the membrane in use free-floating with respect to the contiguous structural masses for permitting relative movement parallel to the sheet and providing a waterproof barrier between the masses.

11. A membrane for construction purposes comprising a permanently plastic laminated waterproof sheet interposed between adjacent structural masses and having surfaces adapted in use to render the membrane free-floating with respect to the contiguous structural masses for permitting relative movement parallel to the plane of the sheet and providing a waterproof barrier between the masses.

12. In a waterproof membrane for construction purposes, a sheet adapted for laying between adjacent structural masses and comprising a plurality of bituminized fabric layers with intervening layers of a bituminous compound, and non-bituminized fibrous sheets bonded to the outer fabric layers of the membrane and having their outer surfaces non-cohesive to the adjoining construction masses, for permitting relative movement parallel to the plane of the sheet and providing a waterproof barrier between the masses.

13. A building construction having adjacent structural masses subject to seepage of moisture from one to the other, a free-floating waterproof membrane laid between the masses and comprising a laminated sheet of waterproof material surfaced with material permanently non-cohesive to the adjoining mass for permitting relative movement substantially parallel to the sheet and providing a waterproof barrier between the masses.

14. A building construction comprising adjacent structural masses, a membrane comprising a sheet of waterproof material interposed between the masses and providing a waterproof barrier therebetween, and an external layer upon the membrane permanently separating the waterproof sheet from the adjoining construction mass and providing a plane of slippage between the waterproof sheet and the mass for permitting relative movement parallel to the plane of the sheet.

EDGAR M. TUCKER.